UNITED STATES PATENT OFFICE.

KARL P. McELROY, OF WASHINGTON, DISTRICT OF COLUMBIA, ASSIGNOR TO FERRO CHEMICALS INC., OF WASHINGTON, DISTRICT OF COLUMBIA, A CORPORATION OF DELAWARE.

PROCESS OF MAKING AMMONIA.

1,390,533.     Specification of Letters Patent.     Patented Sept. 13, 1921.

No Drawing. Application filed December 24, 1917, Serial No. 208,647. Renewed February 7, 1921. Serial No. 443,224.

*To all whom it may concern:*

Be it known that I, K. P. McELROY, a citizen of the United States, residing at Washington, in the District of Columbia, have invented certain new and useful Improvements in Processes of Making Ammonia, of which the following is a specification.

This invention relates to processes of making ammonia; and it comprises a method of producing ammonia from atmospheric nitrogen wherein an apparatus of the general type of a gas producer or blast furnace is charged with carbon (charcoal, coal or coke), a natural silicious material containing potash, lime or limestone, and returned alkali together with, usually, more or less iron, and is run with the aid of a hot blast at such a temperature as to form a molten slag and fumes of potassium cyanid, such fumes of cyanid being led off together with the producer gas formed, the fumes condensed to separate the same from the gas, the cyanid broken up with steam or hot water to form ammonia and recover potash, and the recovered potash returned to the charge; all as more fully hereinafter set forth and as claimed.

It has long been known that potassium cyanid is readily formed by the interaction of nitrogen, potash (as hydrate or carbonate) and carbon at about a red heat; and various attempts, some on a rather large commercial scale, were made to utilize this fact many years ago; but without success for the reason that the cyanid cost more to produce than it was worth. Mostly alkalized charcoal was used; that is, charcoal soaked in a solution of potassium carbonate to secure intimate contact, and then dried. This material was heated in various ways (generally in retorts) in a current of nitrogen, (or of air deoxidized by carbon) until cyanidation had gone as far as was deemed advisable. The charcoal was then removed and leached to recover cyanid; or, in case enough of the carbon had disappeared, a molten mixture of cyanids, other salts, slag lumps, excess carbon, etc., was tapped off from the apparatus, cooled and extracted with water. Whatever the way of working, the loss of potash was inordinate; only about a third of the potash used being recovered as cyanid or in any useful form. Part of the loss was as fume carried away by the escaping gases, the cyanid like other potassium salts being rather volatile; part was due to lixiviation losses and part was unaccounted for. Much of the potash was converted into complex silicates and other insoluble compounds; and much of the carbon left in the treated charge was so fine as to make thorough leaching unprofitable. There were heating and other difficulties in the operation; but the non-success was mainly due to this loss of potash.

In the present invention it is my chief aim to convert atmospheric nitrogen into ammonia and I utilize the described cyanid-forming reaction as a means to this end. In the cyanid-making operation however I rearrange conditions so as to obviate and avoid the noted difficulties. Slagging losses I reduce or obviate by the use of high temperatures and enough lime to make a basic slag; and by the use of basic-lined reaction chambers. Lixiviation losses are avoided by wholly consuming the carbon and by working at temperatures high enough to produce cyanid in volatilized or fume form passing forward with the effluent gases from which it is subsequently separated and recovered. The recovered cyanid is treated with steam or hot water to hydrolize or break it up into ammonia and oxidized potassium compounds; these latter being then returned to the cyanid-making operation for use anew. As will be noted, the potash in the present invention is, so to speak, in cyclic circulation; the same potash is used over and over again producing indefinitely great amounts of combined nitrogen in the form of ammonia. There is of course some loss of potash, but in operating under the stated conditions this loss does not amount to much; and what deficit there may be is cheaply and readily replenished by including in the charge relatively small proportions of natural potassiferous silicates such as feldspar, greensand, leucite, etc. As the formation of a certain amount of slag in the present operation is desirable, it is possible to use rather more of these minerals than will suffice to replenish potash losses, in which event there may even be a surplus of potash. However, as stated, the main object of the present invention is the production of ammonia rather than any other product;

and such potash or potassium cyanid as may be incidentally produced or marketed I regard as a by-product.

In the cyanid-making stage of my operation, I use an apparatus of the general type of an ordinary "slagging gas producer" adapted for high temperatures. It is best lined with a basic lining such as magnesia or dead-burnt dolomite, and may have water-cooled walls. The charge is composed of coal or coke, recovered potash, lime or limestone and potash-bearing silicates in sufficient amounts to make up for any losses of potash in the operation. Usually I include some iron or iron oxid in the charge. Air is supplied as a hot blast; heating of the blast being by the use of ordinary blast furnace stoves, or by regenerators or recuperators deriving heat from the waste gases of the operation. These gases are very hot and are of high combustible value. No intimate mixture of the charge components is necessary; and on the other hand the charge should be open and permeable to permit ready passage of the draft. The use of rather coarse strong coke of the grade known as metallurgical coke is advisable. Coal or charcoal may be used. Charcoal has the advantage that it imports some potash and some lime into the charge; but its use is not necessary. In one respect the apparatus differs from ordinary types of slagging producers; in that the gases are taken off at the point in the apparatus where the gas is at or near the maximum heat and are not made to pass through the incoming charge. This is, of course, for the stated reason that the potassium cyanid is to be produced in fume form and carried forward by the gases out of the apparatus so that filtration and cooling of the gases by the cold charge is not permissible.

In the reaction apparatus, the use of the hot blast develops a very high temperature and forms ordinary producer gas; that is a mixture of carbon monoxid (CO) and nitrogen. The carbon monoxid is, for present purposes, and at the temperatures here used, inert. In the operation the carbon reacts on the potash, reducing it to metallic potassium and forming more carbon monoxid. Since potassium boils at about 720° C. and the temperatures in the reaction chamber are here intended to be at least 1000° C., and may be much higher with advantage, the potassium is produced in vapor form; in which condition its union with carbon and nitrogen to form cyanid takes place readily and quickly. As the carbon wastes away in the formation of producer gas, and potassium cyanid, its ash constituents unite with and are fluxed by the lime of the charge to form a fusible basic slag. In proportioning the charge I commonly use as much limestone or lime as possible without making the slag too infusible to flow readily. Such a slag at the temperatures here used has but little tendency to take up potash or metallic oxids such as oxids of iron and is light colored. The more basic the slag can be made, the less is the tendency to loss of potash in it. Enough lime is of course added to take care of the added potassiferous silicates of the charge. As such silicates I may use feldspar (orthoclase) or leucite, both of which are rich in potash; or I may use greensand which is a double silicate of iron and potassium. The use of greensand has the advantage that it puts iron in the charge where it is desirable. Iron seems to have a catalytic effect in promoting the formation of cyanid; and such iron silicates as may enter the slag render it more fusible. Any iron produced in the operation may of course be marketed as a valuable by-product. When I do not use greensand and where my charge materials are rather low in iron, I usually add some iron in the form of iron ore or slags from operations delivering highly ferruginous slags. Or I may employ a little scrap iron. As long as there is some iron in the charge, the form in which it is added is not very material. The use of greensand has the advantage that it adds iron and potash simultaneously and that it is a very cheap material.

I provide the reaction chamber or producer with the usual type of twyers and slag notches. Such iron as may be produced in the action is tapped off in the usual manner. It may be returned to the charge if desired; or some proportion of it may be so returned. The gas produced is like ordinary producer gas have that it is considerably richer. All the actions in the apparatus produce carbon monoxid while a considerable proportion of the diluting nitrogen is taken out as cyanid. The cyanid is formed as a fume; usually black from accompanying carbon and dust. The presence of this carbon or dust is of no consequence and no measures need be taken to avoid it since all solid matters are ultimately returned to the reaction chamber where carbon and carbonaceous materials are burnt and silicates fluxed.

The very hot gas carries cyanid and, usually, more or less fumiform potash in other compounds and these materials may be separated from the gas in any of the usual ways adopted for separating and recovering fume. For this purpose, the gas is best cooled somewhat to condense any potassiferous vapors though this cooling need not be to any low degree. After leaving the reaction chamber it may be first led through a comparatively large steel quieting chamber where it is somewhat cooled and its velocity reduced, with the result of depositing much of the cyanid as dust or molten liquid as the case may be. From this quieting chamber it may be led through baffled chambers, centrifugal fume separators, filters, electrical precipitators, or any other suitable device for collecting residual fume. Electrical precipitators, such as those formerly used for collecting sublimed white lead, work well. The use of bag filters is not advisable, potassium cyanid being corrosive in its action on textile fibers in the presence of moisture. It is also inadvisable to use steam for condensing, or aiding in condensing, the fume since this leads to formation of ammonia which goes forward with the residual gas. To collect this ammonia, the gas must be cooled and its heat is thereby usually wasted.

After collection of the cyanid, it is placed in any suitable steel or iron container and steamed. The use of high temperature steam is advisable. The cyanid may be placed in an autoclave or an ordinary boiler and heated with water under pressure; but the use of steam is simpler. Steam reacts with the cyanid to form ammonia, which goes forward as a gas for collection in the usual ways, and potassium formate; this formate usually then breaking down again to a greater or less extent to form carbonate and various other bodies. The residue after the steaming is a saline mass containing potassium formate, carbonate, hydrate, etc. Often it contains more or less nitrogen. Its composition is, however, for the present purposes a matter of more or less indifference since I return it to the producer where it is at once broken up, giving potash and potassium. According to the circumstances and the temperatures used in hydrolysis, the residue may appear as a dry saline mass, a fused material or a water solution. Whatever its state, it is returned to the reaction chamber in any convenient way. One convenient way is to make a concentrated solution or magma of it, if it be not such a solution or magma already, and sprinkle this over one or more of the constituents of the charge on the way to the reaction chamber. Distributing it rather uniformly through the charge in some manner is advantageous though not necessary since its potassium will be released as vapor and permeate the charge in any event. Using a solution or a wet magma, unless special drying means for the charge be adopted, it is better to prolong the reaction chamber upwards some distance beyond the point of gas exit to allow a certain amount of drying to take place without interfering with the high temperatures in the reaction zone. I do not desire water vapors to gain access to my reaction zone although a certain amount may there occur without material influence on the actions. For this reason if it be desirable to supply an endothermic to the draft, I furnish it as products of combustion. I may, for example, burn a certain amount of the gas freed from cyanid and introduce the hot products of combustion directly into the draft current.

The slag produced in the present process because of its highly basic nature has a certain degree of hydraulic nature; and it may be ground and used for cementitious purposes; or it may be used as a component of mixtures for making cement clinker. Being very low in iron it is light colored or gray. The rich producer gas formed may be used for any of the ordinary heating or power purposes. Because of its richness in CO and freedom from hydrogen it is well adapted for use in gas engines. Some of it is usually employed for heating the blast; but this is ordinarily only a minor amount.

As will be noted, in the present process I am virtually deriving my potash from the cheap natural silicates while at the same time I am using in my reaction chamber a charge which is much more concentrated as regards potash than any charge which could be obtained by the use of such natural silicates as the only potassiferous components. The consumption of fuel is only that which is necessary for keeping up the temperature in the producer, for forming the cyanid and for forming and melting a small amount of slag; while an exceptionally rich producer gas is given to help pay part of the operation. Ammonia is formed from atmospheric nitrogen with only the consumption of fuel and limestone and such an amount of natural potassiferous silicates as may be necessary to supply and replenish the amount of circulating potash. The replenishing amount necessary is always small; and as stated it may often be increased with advantage to give a little potash as a valuable by-product. Instead of using silicates rich in potash such as feldspar, greensand, mica (mica schist, etc.,) for replenishment it is of course quite possible in view of the small amount ordinarily needed to use materials not so rich, such as ordinary granites, gneisses, syenites, leucite rocks, etc. Granites and gneisses often run 2 to 6 per cent. $K_2O$, and 100 pounds of granite will of course introduce 2 to 6 pounds of $K_2O$ which is often all that is needed for replenishment of some tons of charge.

While I have spoken specifically of the use of potash in my charge it will of course be understood that sodium may also occur therein and play a useful part. Sodium is not nearly so active in forming cyanid as potassium; but it has a certain measure of activity; and particularly in the presence of plenty of iron. The natural silicates used for replenishment, even when characteristically potassium minerals, nearly all contain substantial amounts of sodium; and its presence does no harm. Sodium has more tendency to enter the basic slags made in the present process than has potassium and where both alkalis are present, the sodium tends to exclude the potassium from the slag. The presence of some sodium is therefore often useful, apart from its cyanid forming activity, in permitting less basic and more fusible slags to be made and lower temperature operation without corresponding loss of potash. But I deem it better where using both alkalis to have more potash than soda; say at least twice as much. Where it is desirable to add replenishing soda, ordinary soda ash (sodium carbonate) may be used. Some measure of the advantages of the present process may be attained by using soda instead of potash. In so doing, the charge may be made up of recovered soda, a certain amount of soda ash, iron ore, coke and limestone; and the operation otherwise conducted as previously described.

Most potassiferous minerals contain more of less of the other alkali metals (lithium, rubidium and cæsium) and these no no harm in the process. They are more active than sodium and replace the potassium to the extent to which they occur. By using plenty of replenishing silicates and removing some of the potassium formed in producing ammonia, these other alkalis may be made to accumulate in the charge. By using lithia mica, for example, as the replenishing silicate, lithia may be made to accumulate in the charge.

In operation under the present invention, potash from any convenient source may be employed in making the charge. It should be relatively free from chlorids or sulfates. Or, the charge may be made with a natural silicate without added potash and the charge gradually built up to the desired richness in potash by return of potash recovered from the cyanid.

What I claim is:—

1. The process of producing ammonia which comprises passing air at a high temperature through a pervious charge comprising lime, carbon and returned potash, the temperature being high enough to produce potassium cyanid in fume form, removing the hot gases containing the fume, separating the fume to recover potassium cyanid, hydrolyzing the potassium cyanid to produce ammonia and a potassiferous residue and returning the potassiferous residue to form part of a charge.

2. The process of producing ammonia which comprises passing air at a high temperature through a pervious charge comprising lime, carbon and returned potash and potassiferous silicates, the temperature being high enough to produce potassium cyanid in fume form, removing the hot gases containing the fume, separating the fume to recover potassium cyanid, hydrolyzing the potassium cyanid to produce ammonia and a potassiferous residue and returning the potassiferous residue to form part of a charge, the amount of such potassiferous silicates being at least sufficient to replenish potash losses in the operation.

3. The process of producing ammonia which comprises passing air at a high temperature through a pervious charge comprising lime, iron, carbon and returned potash, the temperature being high enough to produce potassium cyanid in fume form, removing the hot gases containing the fume, separating the fume to recover potassium cyanid, hydrolyzing the potassium cyanid to produce ammonia and a potassiferous residue and returning potassiferous residue to form part of a charge.

4. The process of producing ammonia which comprises passing air at a high temperature through a pervious charge comprising lime, iron, carbon and returned potash and potassiferous silicates, the temperature being high enough to produce potassium cyanid in fume form, removing the hot gases containing the fume, separating the fume to recover potassium cyanid, hydrolyzing the potassium cyanid to produce ammonia and a potassiferous residue and returning potassiferous residue to form part of a charge, the amount of such potassiferous silicates being at least sufficient to replenish potash losses in the operation.

5. In the manufacture of ammonia from atmospheric nitrogen the process which comprises treating a quantity of potash with carbon and with nitrogen in the form of air at a high temperature to form fumiform cyanid, removing the fumes and collecting the cyanid, hydrolyzing the cyanid to form ammonia and potash compounds and returning the potash compounds for retreatment with carbon and nitrogen at a high temperature.

6. In the manufacture of ammonia from atmospheric nitrogen the process which comprises continuously supplying to a reaction chamber of the nature of a slagging producer a pervious charge comprising returned potash, fuel, sufficient lime to form a basic slag and a replenishing amount of potassiferous natural silicate, blowing such charge with hot air to produce a temperature therein at which potassium cyanid will be produced in fume form and such slag will be fused, tapping off the molten slag, removing the gases and fumes of potassium cyanid, hydrolyzing the cyanid to form ammonia and a potassiferous residue and returning such residue to the charge.

7. In the manufacture of ammonia from atmospheric nitrogen the process which comprises supplying a suitable producer-like basic lined reaction chamber with a charge of natural silicious material containing potash, fuel and limestone, blowing the same with hot air to establish a temperature capable of forming fumiform potassium cyanid and molten slag, removing the gases containing the cyanid, hydrolyzing the same to form ammonia and residual potash, returning residual potash to the charge, and continuing the operation with a charge composed of such returned potash, fuel, limestone and such an amount of such silicious material as may be necessary to compensate for losses in potash.

8. In the fixation of atmospheric nitrogen the process which comprises employing potassium in uninterrupted cycle, said potassium passing first in contact with fuel and nitrogen at a high enough temperature to form and volatilize potassium cyanid, enough lime being present during this stage to prevent removal of potash by ash components of said fuel, recovering the potassium cyanid fumes, hydrolyzing said cyanid to form ammonia and returning the residual potassiferous material for contact with fuel and nitrogen as described.

9. In the fixing of nitrogen, the process which comprises feeding through a shaft furnace a charge comprising iron, potassium compounds, lime and carbon while supplying a hot blast to the bottom of the charge, the amount of such lime being sufficient to form a rather basic and light colored slag having a certain amount of hydraulic value, withdrawing hot gases and cyanid fumes carried thereby from a point in the furnace near the point of introduction of the hot blast and collecting the cyanid carried by said gases.

In testimony whereof, I affix my signature hereto.

K. P. McELROY.